United States Patent [19]

McMullin

[11] 4,079,978

[45] Mar. 21, 1978

[54] HOT STICK WITH AIR CUSHION

[75] Inventor: Earl Wayne McMullin, Rutland Township, Barry County, Mich.

[73] Assignee: Hastings Fiber Glass Products, Inc., Hastings, Mich.

[21] Appl. No.: 747,227

[22] Filed: Dec. 3, 1976

[51] Int. Cl.$^2$ .............................................. F16B 7/10
[52] U.S. Cl. ................................. 294/19 R; 248/188.5; 403/109
[58] Field of Search .................... 294/19 R, 57; 16/66, 16/84; 81/53.1; 188/297; 248/188.5, 333, 408; 403/108, 109, 104, 328, 377, 378

[56] References Cited

U.S. PATENT DOCUMENTS

| | | | |
|---|---|---|---|
| 2,291,593 | 7/1942 | Hubbard | 294/19 R |
| 2,719,688 | 10/1955 | Seifert | 248/188.5 |
| 2,881,467 | 4/1959 | Struhar | 16/66 |
| 3,090,988 | 5/1963 | Truhon | 16/84 X |
| 3,103,375 | 9/1963 | McMullin | 248/188.5 X |
| 3,566,434 | 3/1971 | Grinsteiner | 16/66 |

Primary Examiner—Johnny D. Cherry
Attorney, Agent, or Firm—Blanchard, Flynn, Thiel, Boutell & Tanis

[57] ABSTRACT

A telescopic pole having an elongated tubular handle section, an elongated tubular tool section, and one or more intermediate tubular sections. Each of the tool and intermediate sections is slidably telescoped within the next lowermost section and is provided with a manually releasable locking device which coacts with the next lowermost section for holding the sections in a fully extended position. The locking device includes a cylindrical locking member which is sealingly connected to the tubular section on which it is mounted. The locking device is provided with a small bleed hole which provides communication between the interior of the tubular section and the surrounding atmosphere for limiting the escape of air from one tubular section when the adjacent tubular section is being telescopically collapsed therein. The locking member has a cup seal disposed in sliding engagement with the interior of the adjacent tubular section, whereby when the locking member is telescopically collapsed into the adjacent section, the air therein is pressurized and forced outwardly through the bleed hole associated with the other end of said adjacent section. The cup seal also causes any moisture or contamination which collects in the adjacent section to be forced outwardly through the bleed hole.

4 Claims, 3 Drawing Figures

HOT STICK WITH AIR CUSHION

FIELD OF THE INVENTION

This invention relates to a sectional telescopic pole, commonly referred to as a hot stick, for permitting a workman to perform work on electrical power lines and devices associated therewith. The invention particularly relates to an improved telescopic pole which facilitates the collapsing of the pole while minimizing damage thereto, and which prevents accumulation of moisture and contamination within the pole.

BACKGROUND OF THE INVENTION

Service personnel for power companies and the like often utilize a telescopic pole commonly referred to as a "shotgun stick" or a "hot stick" for installing hot line clamps and manipulating other tools when working on or around energized electrical distribution lines. Telescoping poles of this type are disclosed in my earlier U.S. Pat. Nos. 2,980,456, 3,103,375 and 3,788,691. While poles of this type are generally satisfactory, nevertheless additional modifications have been incorporated therein to further improve upon the existing design and thereby make the pole safer and easier to use.

One problem with telescopic poles is the occasional breakage of the locking pins. When the pole is being retracted, the locking pin is manually released and, with the pole in an approximate vertical position, the pole sections are then allowed to freely slidably telescope one within the other due to the urging of gravity. This results in an upper pole section moving downwardly with sufficient speed so that it impacts against the locking device of the lower pole section, whereby the locking pin is often fractured. While a pole failure of this type is normally caused by a misuse of the pole, particularly an improper handling of the pole during collapsing thereof, nevertheless it is desirable to improve upon the pole structure so as to eliminate failures caused by misusage of this type.

In addition, service personnel working with poles of this type have often expressed a fear that moisture or contamination might accumulate within the individual pole sections and cause a potentially unsafe condition due to electrical arcing. While no instance of this happening is known, nevertheless designing the pole to eliminate this possibility greatly enhances both the safety and acceptability of the pole.

Thus, it is an object of the present invention to provide an improved telescopic pole adapted for use with electrical conductors and the like, which pole overcomes the above-mentioned shortcomings. More specifically, it is an object of the present invention to provide:

1. An improved telescoping pole which includes an integral dampening structure coacting between the adjacent pole sections for controlling the relative telescoping movement between the sections during collapsing of the pole.

2. An improved telescoping pole, as aforesaid, which is provided with seals between the locking devices and the tubular pole sections so that each pole section functions as a pneumatic dashpot for regulating the maximum rate at which the pole sections can be telescopically collapsed due to the urging of gravity.

3. An improved telescoping pole, as aforesaid, which has an air bleed hole communicating with the interior of each pole section for controlling the collapsing rate of the pole sections, and for preventing the accumulation of moisture and contamination within the pole sections.

4. An improved telescoping pole, as aforesaid, which provides greater safety to the operating personnel, which is more durable in operation, which possesses the ease of operation of existing poles, and which is economical to manufacture and assemble.

Other objects and purposes of the invention will be apparent to persons familiar with pole structures of this type upon reading the following specification and inspecting the accompanying drawings.

Figure 1:
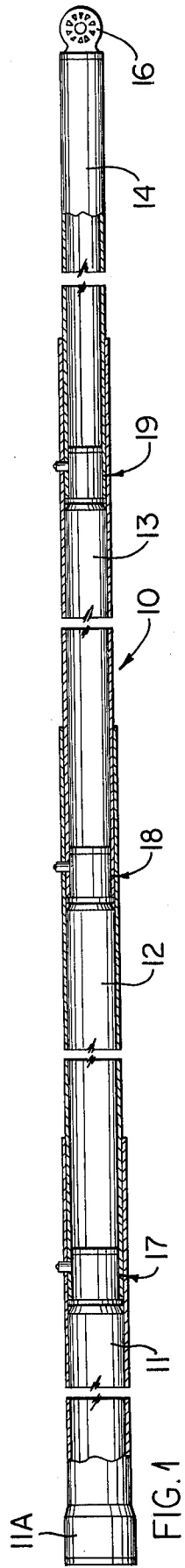
FIG. 1 is a broken, side elevational view, partially in cross section, of a telescoping pole incorporating the improvements of the present invention.

Certain terminology will be used in the following description for convenience in reference only and will not be limiting. For example, the words "upwardly", "downwardly", "rightwardly" and "leftwardly" will designate directions in the drawings to which reference is made. The words "front" and "rear" will respectively refer to the right and left sides of the pole and designated parts thereof as appearing in FIG. 1. The word "forwardly" will refer to the extending movement of the pole which occurs rightwardly into the position shown in FIG. 1, whereas the word "rearwardly" will refer to the collapsing movement of the pole which occurs in the leftward direction in FIG. 1. The words "inwardly" and "outwardly" will refer to directions toward and away from, respectively, the geometric center of the pole and designated pars thereof. Said terminology will include the words specifically mentioned, derivatives thereof and words of similar import.

SUMMARY OF THE INVENTION

In general, the objects and purposes of the invention are met by providing a telescopic pole having an elongated tubular handle section, an elongated tubular tool section, and one or more intermediate tubular sections which slidably telescopically connect the handle and tool sections. Each of the tool and intermediate sections is slidably telescoped within the next lowermost section and is provided with a manually releasable locking device which coacts with the next lowermost section adjacent its free end thereof for holding the sections in a fully extended position. The locking device includes a cylindrical locking member which is sealingly connected to the tubular section on which it is mounted. The locking device is provided with a small bleed hole which provides communication between the interior of the tubular section and the surrounding atmosphere for limiting the escape of air from one tubular section when an adjacent tubular section is being telescopically collapsed therein. The locking member has a cup seal disposed in sliding engagement with the interior of the adjacent tubular section, whereby when the locking member is telescopically collapsed into the adjacent section, the air therein is pressurized and forced outwardly through the bleed hole associated with the other end of said adjacent section. The cup seal also causes any moisture or contamination which collects in the adjacent section to be forced outwardly through the bleed hole.

DETAILED DESCRIPTION

Referring to FIG. 1, there is shown an elongated telescoping pole 10 for manipulating electrical conductors. Pole 10 includes a plurality of elongated tubular fiberglass sections which can be telescopically moved between extended and contracted positions so that the pole, when contracted, can be conveniently stored, while at the same time selective extension of the pole permits it to be utilized for working on an electrical conductor disposed a substantial distance from the operator.

In the illustrated embodiment, the pole 10 consists of four telescopic sections, namely an elongated tubular handle section 11 located at the rearward end of the pole, which section telescopically receives an elongated intermediate tubular section 12. This latter section in turn telescopically receives a further intermediate tubular section 13, which in turn telescopically receives the tool section 14. The tool section 14 is provided with a conventional tool 16 at the free end thereof, which tool is adapted for engaging a suitable electrical conductor handling device and thus may assume many conventional forms, such as illustrated in my earlier U.S. Pat. No. 2,980,456.

To maintain the adjacent pole sections in an extended position, substantially as illustrated in FIG. 1, suitable locking devices coact between each pair of adjacent pole sections. For example, a locking device 17 coacts between pole sections 11 and 12. A further locking device 18 coacts between pole sections 12 and 13, and a still further locking device 19 is provided for coaction between pole sections 13 and 14. The locking devices 17, 18 and 19 are substantially identical so that only the locking device 18 will be described hereinafter.

Figure 2:
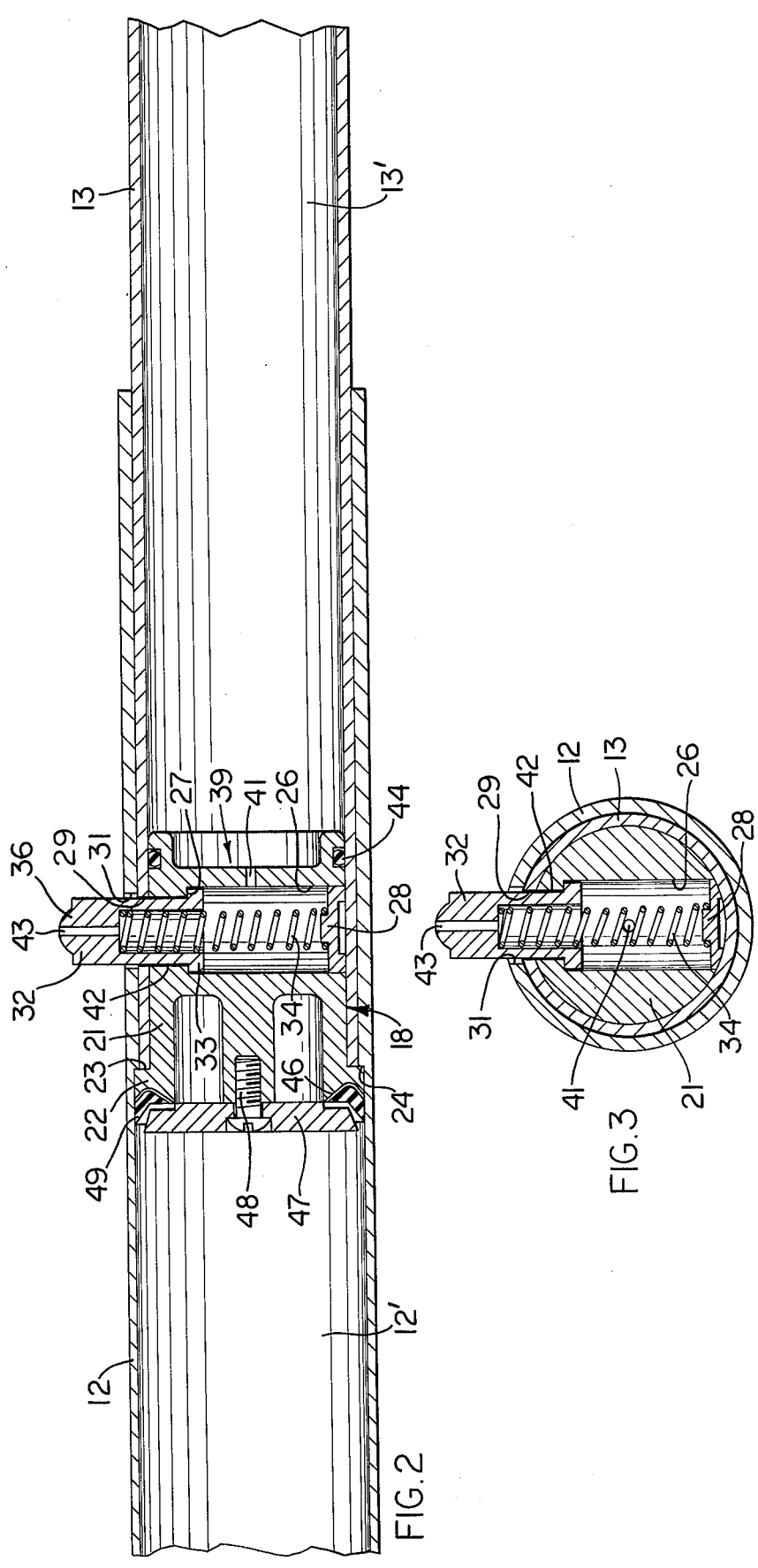
FIG. 2 is a fragmentary, enlarged sectional view showing the locking device which coacts between adjacent pole sections.
Figure 3:
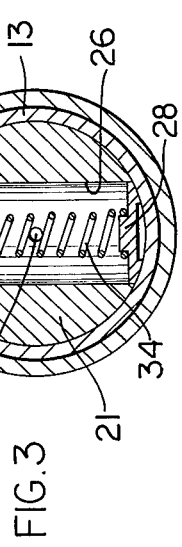
FIG. 3 is a cross sectional view of the locking device of FIG. 2.

Referring to FIGS. 2 and 3, the locking device 18 includes a substantially cylindrical locking member 21 positioned within the rearward end of the tubular section 13. This locking member 21 has an annular flange 22 at its rearward end, which flange projects outwardly beyond the free end of the tubular member 13 and defines a forwardly facing shoulder 23 adapted to abut against a rearwardly facing stop shoulder 24 formed on the outer tubular section 12 adjacent the forward end thereof. The shoulder 24 is, in the illustrated embodiment, formed by providing the outer tubular member 12 with an enlarged wall thickness over a limited portion of the length thereof.

Locking member 21 has a stepped passage 26 extending transversely therethrough, which passage defines an intermediate shoulder 27. The passage 26 is closed at its large end by a plug 28. The small end of passage 26 is aligned with an opening 29 through the wall of the inner pipe section 13 adjacent the lower or rearward end thereof. This opening 29 is adapted to be aligned with a similar opening 31 which extends radially through the wall of the outer pipe section 12 adjacent the front end thereof, which openings are aligned when the pole sections 12 and 13 are in a fully extended position as shown in FIGS. 1 and 2.

The locking device 18 has a pin 32 slidably disposed within the passage 26. Pin 32 has an enlarged annular flange 33 at its inner end and positioned so as to abut against the shoulder 27 to limit the outward movement of the pin. The outer end of pin 32 is of such size that it may slidably extend through the openings 29 and 31 when same are aligned. A conventional compression-type coil spring 34 is disposed between the pin 32 and the plug 28 for continuously urging the pin radially outwardly toward the position shown in FIG. 2. The pin 32, when in the extended position of FIG. 2, provides a positive mechanical lock between the inner and outer pole sections 13 and 12, respectively, for maintaining these sections in their telescopically extended positions.

The pin 32 is provided with a partially spherical projection 36 on its outer end to facilitate, when the pin 31 is depressed inwardly, the radially inward camming of the pin by the outer tubular section 12 so as to lockingly disconnect the inner and outer tubular pole sections due to relative axial movement therebetween.

The telescoping pole 10 as above described is conventional and will be so understood by those familiar with this technology.

According to the present invention, the pole 10 is provided with control means 39 coacting between the adjacent pole sections for retarding the telescopic collapsing of the pole sections. This control means 39 is, as shown in FIGS. 2 and 3, provided in association with the locking devices, such as the locking device 18.

The control means 39 includes a small air bleed hole 41 formed in the locking member 21 for providing communication between the passage 26 and the chamber 13' defined within the interior of the inner pole section 13, which chamber 13' extends between the locking devices 18 and 19. The passage 26 in turn communicates with the surrounding environment by means of a clearance space 42 which extends around the pin 32. This clearance space 42 has an area which is larger than the cross-sectional area of the bleed hole 41, whereby the hole 41 thus regulates the rate at which air can be displaced from the compartment 13' into the surrounding atmosphere. In addition, the discharge of air from the passage 26 into the surrounding atmosphere can be facilitated by providing the pin 32 with a small hole 43 therethrough, which hole can supplement the clarance space 42 is desired.

A conventional resilient O-ring seal 44 is disposed within an annular groove which surrounds the locking member 22, whereby the seal 44 creates a sealed engagement with the inner wall of the pole section 13.

The locking device 18 is also adapted to create a sealed relationship with the outer tubular section 12. For this purpose, locking device 18 has an annular elastomeric cup seal 46 secured to the rearward end of the locking member 21. The cup seal 49 is of a substantially conventional configuration and is secured to the locking member by an annular retainer disk 47 which is fixed to the locking member by a screw 48. The cup seal 46 has an outer resilient flange 49 which, when the compartment 12' defined within the pole section 12 is pressurized, is forced radially outwardly into snug sealing engagement with the interior wall of the pole section 12. This flange 49, however, does not interfere with the free slidable extension of the pole section 13 from within the pole section 12.

While only the locking device 18 and its associated control means 39 have been described in detail above, it will be appreciated that the locking devices 17 and 19 are substantially identical to the locking device 18 and also have suitable control means 39 associated therewith. However, with respect to the locking device 19, same need not be provided with the bleed holes 41 and 42 since the top pole section 14 does not telescopically receive any other pole section therein. The control structure 39, and particularly the bleed hole 41, is normally provided, however, so as to ensure proper drainage of any moisture which might tend to collect within the top pole section 14. With respect to the lower pole section 11, namely the handle section, same is normally provided with a small air bleed hole formed in the lower end thereof, such as through the closed end of the cap 11A, which bleed hole is identical to the hole 41 so as to control the telescopic contraction of the pole section 12 into the handle section 11.

OPERATION

The operation of the pole 10 will be briefly described to ensure a complete understanding thereof.

When the pole is in its fully collapsed position (not shown in the drawings), it is moved into a position of operation by first pulling the tool section 14 outwardly from the intermediate section 13 until the locking device 19 rigidly mechanically locks these two sections together. The section 13 is then pulled outwardly from the intermediate section 12 until these two sections are also mechanically interlocked by the locking device 18. Following this, intermediate section 12 is then pulled outwardly from the handle section 11 until these sections are also mechanically locked by the locking device 17. The locking of the cooperating pole sections occurs substantially automatically due to the spring 34 urging the pin 32 outwardly through the aligned openings 29 and 31 when the two cooperating pole sections are in their fully extended position. With the pole fully extended, as illustrated in FIG. 1, same can then be utilized as desired.

When the pole 10 is to be collapsed, then the button 32 associated with one of the locking devices, such as the device 19, is manually pushed inwardly so as to mechanically disconnect the pole sections 12 and 13. By holding the pole in a partially vertical condition, and by manually holding the pin 32 in its depressed condition, the pole 14 telescopically contracts into the pole section 13 due to the urging of gravity. However, the rate at which the pole section 14 contracts into the pole section 13 is determined by the control means 39. For example, when the pole section 14 moves downwardly into the pole section 13 due to the urging of gravity, the air within chamber 13' is trapped and becomes pressurized, whereby the cup seal 46 associated with the locking device 19 snugly engages the inner wall of the tubular pole section 13. Thus, as the pole section 14 moves downwardly into the pole section 13, the air within chamber 13' is forced through the bleed hole 41 associated with the locking device 18 and thence outwardly from passage 26 through the clearance space 42 (and the hole 43 if utilized) into the surrounding atmosphere. The size of the bleed hole 41 thus regulates the flow of air from the chamber 13' into the surrounding atmosphere and accordingly regulates the rate at which the top pole section 14 can contract into the intermediate pole section 13. In this manner, the contraction can occur automatically due to the effect of gravity but at a controlled rate which prevents the pole sections from collapsing in an uncontrolled manner which would result in the development of undesired impact forces on the locking devices.

When the pole sections are being telescopically collapsed one within the other, as described above, the flange 49 of the cup seal also effectively wipes along the inner wall of the outer pole section and thus removes any moisture which may have accumulated therein, which moisture can thus be discharged to the atmosphere through the control means defined by the openings 41 and 42. These passages 41 and 42 also effectively prevent any accumulation of moisture or water within the pole when it is in its extended operational condition, since the moisture will automatically pass through the openings 41 and 42 and escape to the atmosphere.

While the operational description described relates to the telescoping movement which occurs between the pole sections 13 and 14, it will be appreciated that a similar controlled telescopic contraction occurs between not only the pole sections 12 and 13, but also between the pole sections 11 and 12.

Thus, the control means 39 according to the present invention, as formed by the openings 41 and 42 associated with one locking device (such as the locking device 18) and the cup seal 46 as associated with the next uppermost locking device (such as the locking device 19) thus effectively coacts with one intermediate pole section (such as the section 13) for creating a cushioning effect similar to a pneumatic spring to thereby slow the collapsing or descent rate of the telescoping pole. By providing the O-ring 44 around the periphery of the locking device, this creates a sealed relationship between the locking member and the respective pole section so that the air is thus forced to flow through the bleed hole 41, which bleed hole 41 can be of selected cross-sectional area to provide a desired bleed rate of air so as to provide the desired rate of descent for any pole section.

Although a particular preferred embodiment of the invention has been disclosed in detail for illustrative purposes, it will be recognized that variations or modification of the disclosed apparatus, including the rearrangement of parts, lie within the scope of the present invention.

The embodiment of the invention in which an exclusive property or privilege is claimed are defined as follows:

1. In a telescoping pole assembly for handling electrical power conduits or equipment, including:

elongated telescoping support rod means having an elongated tubular handle section means which is substantially closed at the lower end thereof, at least one elongated tubular intermediate rod section means slidably telescopically received within said handle section means, said intermediate rod section means being axially slidable relative to said handle section means between a collapsed position wherein it is telescopically received substantially within said handle section means and an extended position wherein it axially projects outwardly a substantial distance beyond the front end of said handle section means, and an elongated tubular tool section means slidably telescopically received within said intermediate rod section means, said tool section means being slidable relative to said intermediate rod section means between a collapsed position wherein it is substantially received within said intermediate rod section means and an extended position wherein it projects axially outwardly from the front end thereof;

tool means associated with said tool section means adjacent the forward end thereof for permitting engagment with an electrical distribution line or equipment;

first locking means coacting between said tool section means and said intermediate rod section means for releasably fixing same against axial movement relative to one another when in said extended position;

second locking means coacting between said intermediate rod section means and said handle section means for releasably fixing same against axial movement relative to one another when in said extended position;

said first and second locking means respectively including first and second pluglike members stationarily positioned within the rearward ends of said tool and intermediate section means, respectively, said handle and intermediate section means having opening means formed radially through the wall thereof adjacent the front end of the respective section means, and each said pluglike member having an interior chamber in which is slidably accommodated a spring-urged locking pin which is urged radially outwardly for extension through one of said opening means when the respective section means is in its extended position;

the improvement comprising control means for preventing uncontrolled relative axial movement between coacting adjacent section means when they are being relatively moved toward said collapsed position;

said control means comprising piston means associated with said first pluglike member and disposed in slidable sealed engagement with the interior wall of said intermediate section means when said tool section means is being axially displaced relative to said intermediate section means toward said collapsed position, said piston means being mounted on said first pluglike member;

said control means also including bleed opening means associated with said second pluglike member for providing communication between the interior of said intermediate section means and the surrounding atmosphere; and said bleed opening means including a small bleed opening formed in said second pluglike member and providing communication between the respective interior chamber and the interior of said intermediate section means, said bleed opening means also including a second bleed opening between said interior chamber and the surrounding environment, said second bleed opening being associated with said respective locking pin and having a cross-sectional flow area which is greater than the area of said first-mentioned bleed opening.

2. A pole assembly according to claim 1, wherein said second bleed opening is defined by an annular clearance space which surrounds the respective locking pin.

3. A pole assembly according to claim 1, wherein said second bleed opening is defined by an opening which is formed in and extends through said respective locking pin.

4. In a telescoping pole assembly for handling electrical power conduits or equipment, including:

elongated telescoping support rod means having an elongated tubular handle section means which is substantially closed at the lower end thereof, at least one elongated tubular intermediate rod section means slidably telescopically received within said handle section means, said intermediate rod section means being axially slidable relative to said handle section means between a collapsed position wherein it is telescopically received substantially within said handle section means and an extended position wherein it axially projects outwardly a substantial distance beyond the front end of said handle section means, and an elongated tubular tool section means slidably telescopically received within said intermediate rod section means, said tool section means being slidable relative to said intermediate rod section means between a collapsed position wherein it is substantially received within said intermediate rod section means and an extended position wherein it projects axially outwardly from the front end thereof;

tool means associated with said tool section means adjacent the forward end thereof for permitting engagement with an electrical distribution line or equipment;

first locking means coacting between said tool section means and said intermediate rod section means for releasably fixing same against axial movement relative to one another when in said extended position;

second locking means coacting between said intermediate rod section means and said handle section means for releasably fixing same against axial movement relative to one another when in said extended position;

said first and second locking means respectively including first and second pluglike members stationarily positioned within the rearward ends of said tool and intermediate section means, respectively, said handle and intermediate section means having opening means formed radially through the wall thereof adjacent the front end of the respective section means, and each said pluglike member having an interior chamber in which is slidably accommodated a resiliently urged locking pin which is urged radially outwardly for extension through one of said opening means when the respective section means is in its extended position;

the improvement comprising control means for preventing uncontrolled relative axial movement between coacting adjacent section means when they are being relatively moved toward said collapsed position;

said control means including piston means mounted on said first pluglike member and disposed in slidable sealed engagement with the interior wall of said intermediate section means when said tool section means is being axially displaced relative to said intermediate section means toward said collapsed position;

said control means also including bleed opening means associated with said second pluglike member for providing communication between the interior of said intermediate section means and the surrounding atmosphere; and said bleed opening means including a small bleed opening formed in said second pluglike member and providing communication between the respective interior chamber and the interior of said intermediate section means, said bleed opening means also including a second bleed opening providing communication between said last-mentioned interior chamber and the surrounding environment.

* * * * *